Sept. 12, 1933.  R. C. GRIFFITH  1,926,280

ELECTRIC REGULATING SYSTEM

Filed Oct. 26, 1932

Inventor:
Rolland C. Griffith,
by Chas. W. Vrellar
His Attorney.

Patented Sept. 12, 1933

1,926,280

UNITED STATES PATENT OFFICE

1,926,280

ELECTRIC REGULATING SYSTEM

Rolland C. Griffith, Schenectady, N. Y., assignor to General Electric Company, a corporation of New York Application October 26, 1932. Serial No. 639,679

8 Claims. (Cl. 175—363)

My invention relates to electric regulating systems and more particularly to such systems in which the energy transmitted from an alternating current supply circuit to a load circuit is regulated by means of a grid controlled electric valve.

Heretofore there have been proposed numerous arrangements including electric valves for controlling or regulating the amount of energy transmitted from an alternating current supply circuit to a load circuit. In several of these arrangements the load circuit is directly connected with the supply circuit through one or more electric valves and the phase relation of an alternating potential applied to the grids of the electric valves is controlled by regulating apparatus in response to an electrical condition of the load circuit. My invention relates more specifically to regulating apparatus of this latter type.

It is an object of my invention, therefore, to provide an improved electric regulating system in which the energy transmitted from an alternating current supply circuit to a load circuit is regulated by means of a grid controlled electric valve, and by means of which particularly sensitive and rapid regulation may be obtained.

In accordance with one embodiment of my invention, an alternating current supply circuit is interconnected with a load circuit through one or more electric valves and the grids of the electric valves are excited from a phase shifting circuit energized from the alternating current supply circuit and including a saturable reactor provided with a saturating winding. A vibratory contact regulator, responsive to the electrical condition of the load circuit which it is desired to regulate, is effective to control the energization of the saturating winding of the reactor to vary the phase relation of the alternating potential applied to the grids of the electric valves.

Figure 2:
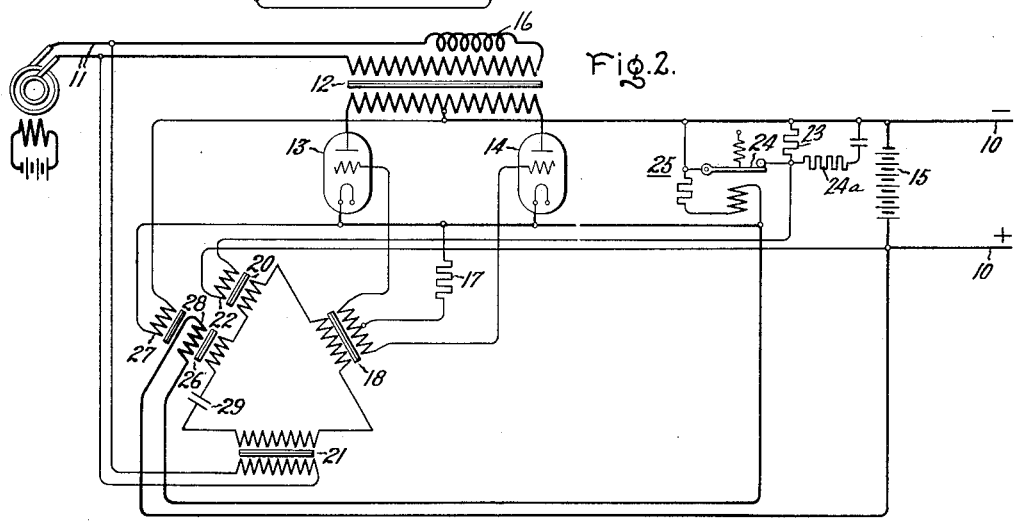
Figure 3:
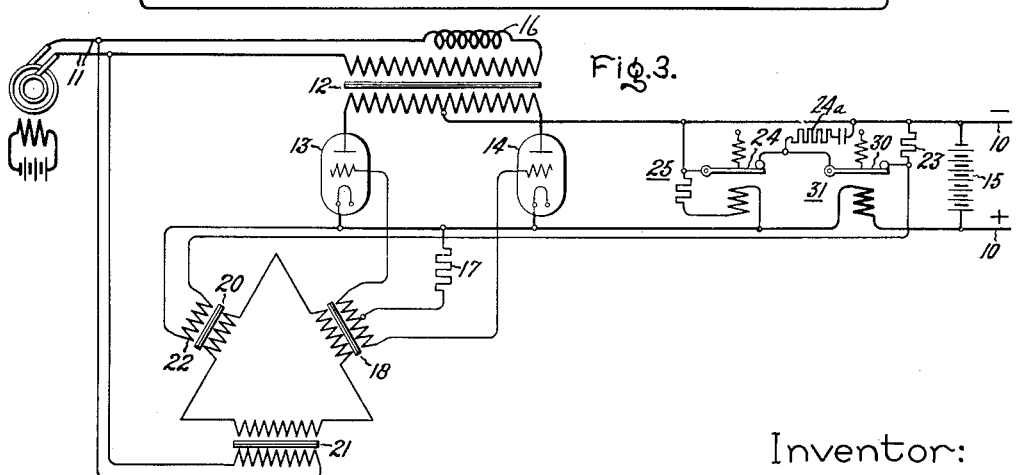

For a better understanding of my invention, together with other and further objects thereof, reference is had to the following description taken in connection with the accompanying drawing, and its scope will be pointed out in the appended claims. Referring to the drawing, Fig. 1 illustrates an embodiment of my invention for maintaining constant the voltage of a direct current circuit supplied from an alternating current supply circuit through a pair of grid controlled rectifying valves, Fig. 2 shows a modification of the arrangement of Fig. 1 in which regulation is effected jointly in response to current and the voltage of the load circuit, while Fig. 3 illustrates a modification of the arrangement of Fig. 2 in which regulation is effected by two independent vibratory contact regulators responsive respectively to the current and voltage of the load circuit.

Figure 1:
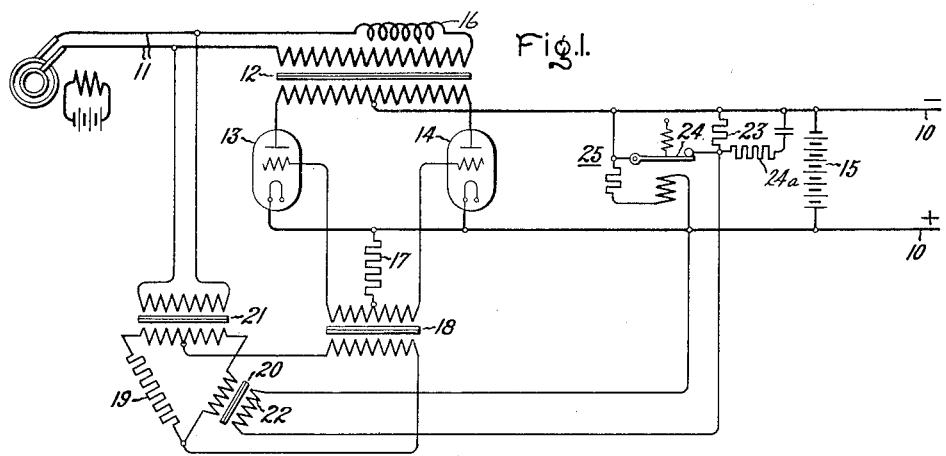

Referring now more particularly to Fig. 1 of the drawing, I have illustrated an arrangement for energizing a direct current load circuit 10 from an alternating current supply circuit 11 through a rectifying apparatus comprising a transformer 12 and a pair of electric valves 13 and 14 connected in a conventional manner to secure full wave rectification. The direct current circuit 10 may be connected to any suitable direct current load device or circuit, although the apparatus embodying my invention is particularly suitable for regulating the charging current of a battery 15. A current smoothing reactor 16 is preferably included in the alternating current circuit, as illustrated, to limit the peak values of the valve currents, although in some cases it may be desirable to include the reactor in the direct current circuit. The valves 13 and 14 are each provided with an anode, a cathode, and a control grid, and may be of any of the several types well known in the art, although I prefer to use valves of the vapor electric discharge type. In order to control the conductivity of electric valves 13 and 14, their grids are connected to their common cathode circuit through a current limiting resistor 17 and opposite halves of the secondary winding of a grid transformer 18, the primary winding of which may be energized from the circuit 11 through a suitable phase shifting circuit. By way of example I have illustrated an impedance phase shifting circuit comprising a resistor 19 and a reactor 20 serially connected across the secondary winding of a transformer 21, the primary winding of which is energized from the circuit 11. The reactor 20 is of the saturable type and is provided with a saturating winding 22, the energization of which is controlled in response to variations of the electrical condition of the circuit 10 which it is desired to regulate. In the arrangement illustrated, which is effective to maintain constant voltage on the direct current circuit 10, the winding 22 is connected across the direct current circuit 10 through a resistor 23 which is connected to be short-circuited through the normally closed contacts 24 of a vibratory contact regulator 25 connected across the direct current circuit 10. A discharge circuit 24a comprising a series connected resistor and condenser is preferably connected across the contacts 24 to minimize sparking.

The general principles of operation of the above described controlled rectifier will be well understood by those skilled in the art. If the alternating potential supplied to the grids of the electric valves 13 and 14 is substantially in phase with that of the alternating current circuit 11, each of the valves 13 and 14 will be fully conductive during their respective half cycles of positive anode potential and a maximum average voltage will be impressed upon the direct current circuit 10. By retarding the phase of the potential supplied to the grids of the valves 13 and 14, however, the point in the cycle of alternating potential at which an electric valve becomes conductive is delayed with the result that each of the valves 13 and 14 will conduct for only a portion of their respective half cycles of positive anode potential and the average voltage impressed upon the direct current circuit 10 will be reduced.

With the contacts of the vibratory regulator 25 closed, as illustrated, the saturating winding 22 is energized with the full voltage of the direct current circuit 10 and the impedance of the reactor 20 is a minimum. The relative impedances of the resistor 19 and the reactor 20, when in such a saturated condition, should be chosen so that the potential applied to the primary winding of the grid transformer 18 is substantially in phase with that of the alternating current circuit 11, so that electric valves 13 and 14 are substantially fully conductive, or at least sufficiently conductive to supply normal voltage to the circuit 10 under the maximum load conditions for which the apparatus is designed to operate. If it is assumed that some intermediate value of load is drawn by the battery 15 or the direct current circuit 10, the voltage of the direct current circuit 10 will tend to rise above that for which the vibratory regulator 25 is set, the contacts 24 will open, and the resistor 23 will be included in the energizing circuit of the saturating winding 22. As the saturation of reactor 20 is decreased its impedance increases, and the potential impressed upon the grid transformer 18 is retarded in phase, as is well understood by those skilled in the art. Again, the constants of the resistor 23, the reactor 20 and the resistor 19 should be so chosen that, with the resistor 23 included in the circuit of the saturating winding 22, the grid potential applied to the valves 13 and 14 will be retarded sufficiently to maintain the average voltage impressed upon the direct current circuit 10 at or below normal voltage under the minimum load conditions for which the apparatus is designed to operate, which may for example, be under no load conditions. Contacts 24 will vibrate in the manner of the well known Tirrill type of regulator to maintain an average current in the saturating winding 22 of the proper value to determine the phase relation of the grid potential of electric valves 13 and 14 for normal voltage on the direct current circuit 10 under existing load conditions. While the current in the saturating winding 22 may fluctuate considerably at the frequency of operation of the contacts 24, the unidirectional component of flux to the reactor 20 will remain substantially constant due to the short-circuiting effect of its alternating current winding included in the impedance bridge circuit. It has been found that more satisfactory conditions are obtained if the natural frequency of the vibratory contact regulator is at least twice the frequency of the alternating current circuit 11.

In the modification illustrated in Fig. 2, there is included in series with the saturable reactor 20 an additional saturable reactor 26, the reactance of which is normally considerably greater than that of the reactor 20. The reactor 26 is provided with a saturating winding 27 connected directly across the direct current circuit 10 and provided with sufficient ampere turns to normally saturate reactor 26 considerably above the knee of the saturation curve. Reactor 26 is also provided with an additional saturating winding 28 connected in series with the direct current circuit 10 and wound differentially with respect to the winding 27. If desired, a capacitor 29 may be connected in series with reactor 26 to compensate for the minimum reactance of the reactor 26 when in a saturated condition. In this arrangement also, the grid transformer 18 replaces the resistor 19 in the phase shifting circuit, as this transformer has a resistance characteristic on its primary side because of the low reactance of its secondary circuit, but the grid transformer may be connected as in the arrangement of Fig. 1 if desired. However, this feature of controlling an electric valve rectifier by means of a saturable reactor, the saturation of which is varied in one sense for predetermined values of load current, and varied in an opposite sense for further increases in load current, forms no part of my present invention but is disclosed and broadly claimed in a copending application of August Schmidt, Jr., Serial No. 574,844, filed November 13, 1931, and assigned to the same assignee as the present application. Under normal operating conditions, the operation of the apparatus illustrated in Fig. 2 is similar to that of the arrangement illustrated in Fig. 1, the saturating winding 27 maintaining the reactor 26 normally saturated, and the capacitor 29 compensating for the residual reactance. When, however, the load current rises to a predetermined value so that the resultant ampere turns of the saturating windings 27 and 28 magnetize the reactor 26 below the knee of the saturation curve, the reactor 26 becomes desaturated and the phase of the potentials applied to the grids of the valves 13 and 14 is rapidly retarded, due to the high reactance of the reactor 26 in an unsaturated condition. With such an arrangement, the voltage of the direct current circuit 10 is maintained at its normal value up to a predetermined value of current, beyond which the average voltage is rapidly reduced with increases in load.

The arrangement of Fig. 3 is similar to that of Fig. 1 with the exception that the contacts 30 of the vibratory contact current regulator 31 are included in series with the contacts 24 of the voltage regulator 25. The current regulator 31 is preferably set so that it will not come into action until the current in the circuit 10 has exceeded a predetermined value, in which case it will come into action and retard the phase of the grid potentials of the electric valves 13 and 14 to limit the load current to its predetermined value, irrespective of the impedance of the load circuit 10. In this arrangement, also, the grid transformer 18 replaces the resistor 19 in the phase shifting circuit, as in the arrangement of Fig. 2.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An electric regulating system comprising an alternating current supply circuit, a load circuit, a grid controlled electric valve for controlling the energy transmitted between said circuits, phase shifting means energized from said supply circuit and including saturable reactor means provided with a saturating means, a control circuit for said valve energized from said phase shifting means, and a contact making device responsive to an electrical condition of said load circuit for controlling the energization of said saturating means.

2. An electric regulating system comprising an alternating current supply circuit, a load circuit, a grid controlled electric valve interconnecting said circuits, phase shifting means energized from said supply circuit and including a saturable reactor provided with a saturating winding, a control circuit for said valve energized from said phase shifting means, and a vibratory contact regulator responsive to an electrical condition of said load circuit for controlling the energization of said saturating winding.

3. An electric regulating system comprising an alternating current supply circuit, a direct current load circuit, a grid controlled rectifying valve interconnecting said circuits, a phase shifting circuit energized from said supply circuit and including a saturable reactor provided with a saturating winding, a control circuit for said valve energized from said phase shifting means, a circuit including an impedance device for energizing said saturating winding from said direct current circuit, and a vibratory contact regulator responsive to an electrical condition of said load circuit for intermittently short-circuiting said impedance device.

4. An electric regulating system comprising an alternating current supply circuit, a load circuit, a grid controlled electric valve for controlling the energy transmitted between said circuits, phase shifting means energized from said supply circuit and including saturable reactor means provided with saturating means, a control circuit for said valve energized from said phase shifting means, and a contact making device responsive to the voltage of said load circuit for controlling the energization of said saturating means.

5. An electric regulating system comprising an alternating current supply circuit, a load circuit, a grid controlled electric valve for controlling the energy transmitted between said circuits, phase shifting means energized from said supply circuit and including saturable reactor means provided with saturating means, a control circuit for said valve energized from said phase shifting means, and vibratory contact means responsive to the current of said load circuit for controlling the energization of said saturating means.

6. An electric regulating system comprising an alternating current supply circuit, a load circuit, a grid controlled electric valve for controlling the energy transmitted between said circuits, phase shifting means energized from said supply circuit and including saturable reactor means provided with saturating means, a control circuit for said valve energized from said phase shifting means, and contact making means responsive jointly to the current and voltage of said load circuit for controlling the energization of said saturating means.

7. An electric regulating system comprising an alternating current supply circuit, a load circuit, a grid controlled electric valve interconnecting said circuits, phase shifting means energized from said supply circuit and including a pair of saturable reactors each provided with a saturating winding, a control circuit for said valve energized from said phase shifting means, a vibratory contact regulator responsive to the voltage of said load circuit for controlling the energization of the saturating winding of one of said reactors, and a circuit for energizing the saturating winding of the other of said reactors in accordance with the current of said load circuit.

8. An electric regulating system comprising an alternating current supply circuit, a load circuit, a grid controlled electric valve interconnecting said circuits, phase shifting means energized from said supply circuit and including a saturable reactor provided with a saturating winding, a control circuit for said valve energized from said phase shifting means, a vibratory contact regulator responsive to the current of said load circuit and a vibratory contact regulator responsive to the voltage of said load circuit for jointly controlling the energization of said saturating winding.

ROLLAND C. GRIFFITH.